United States Patent Office 2,967,346
Patented Jan. 10, 1961

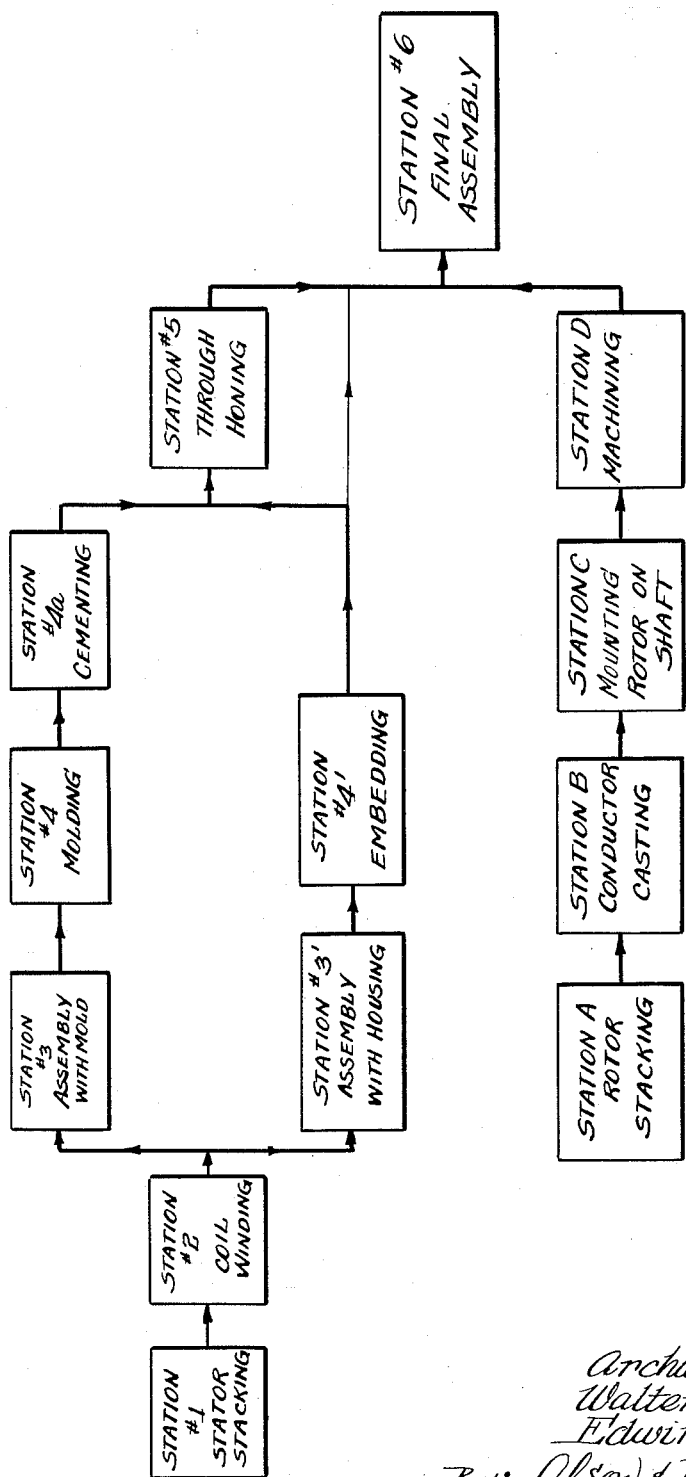

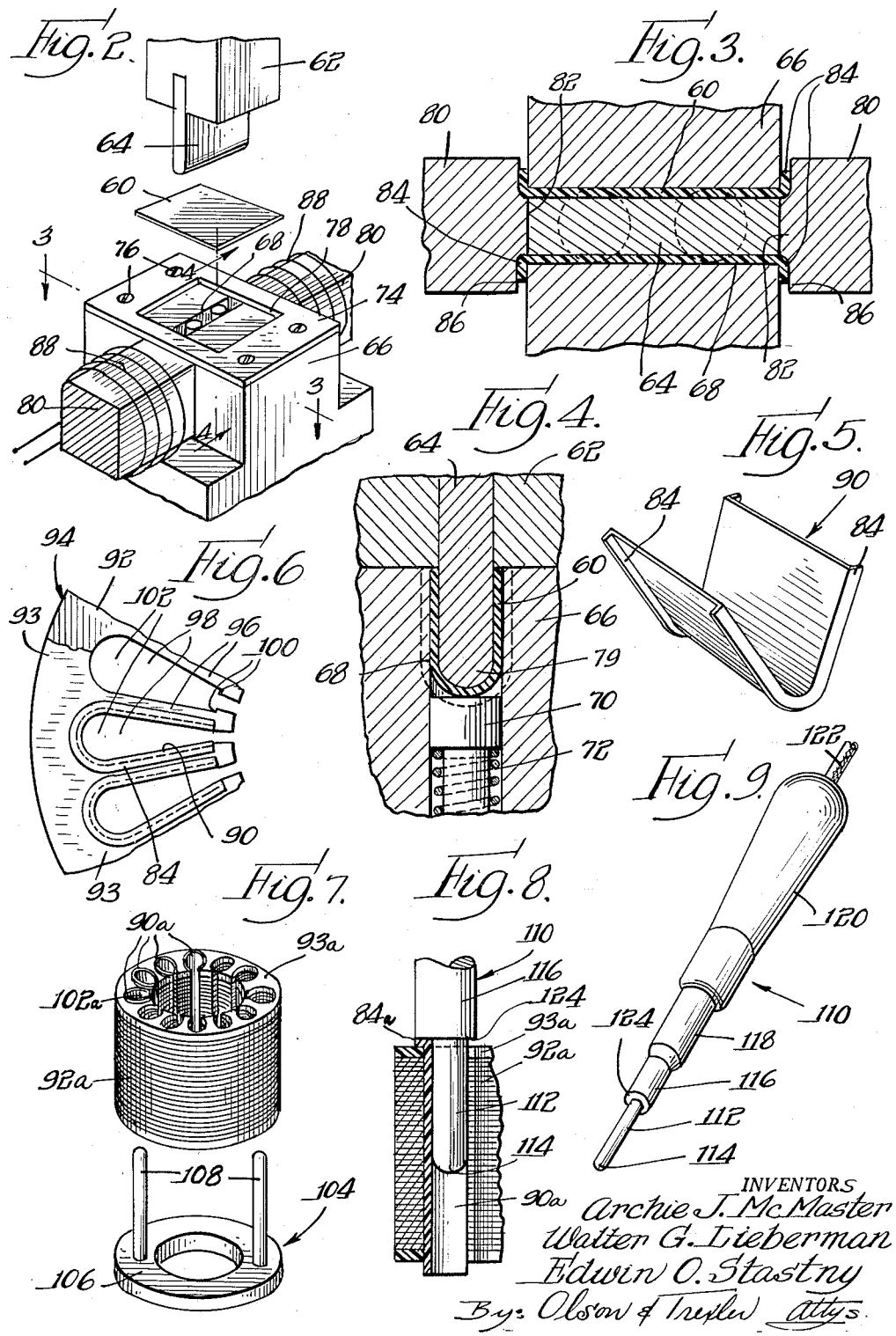

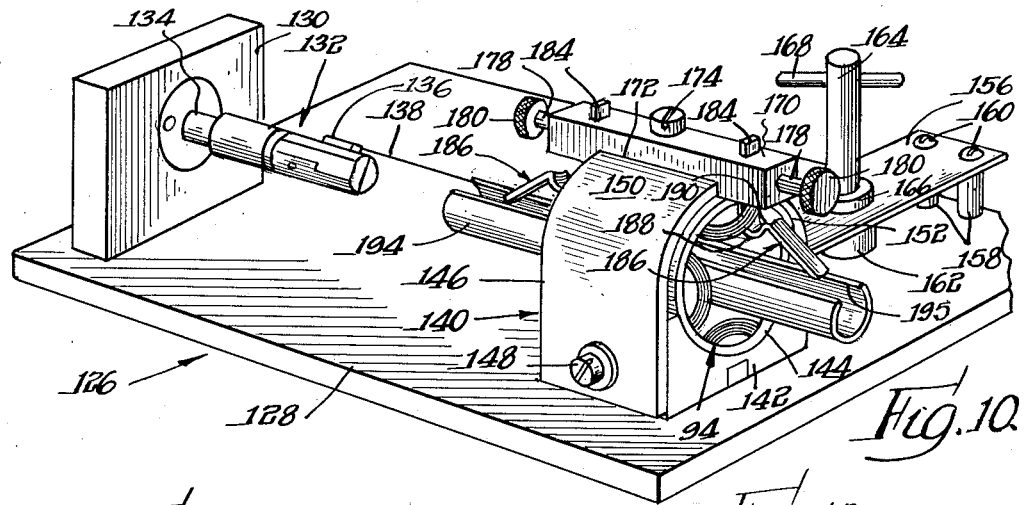
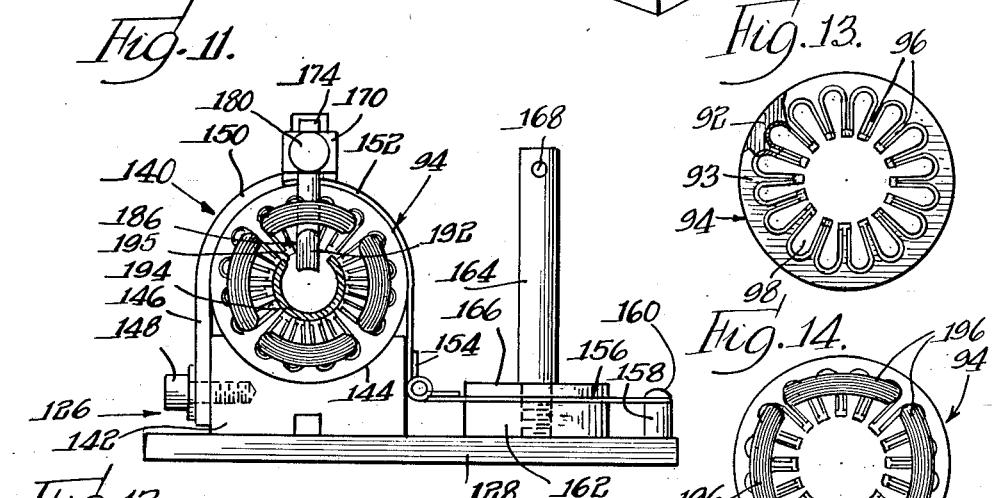
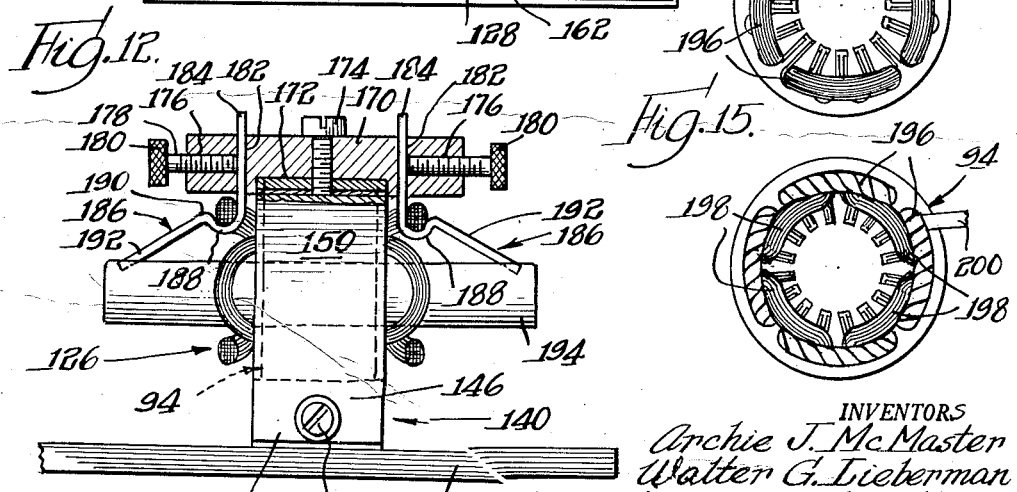

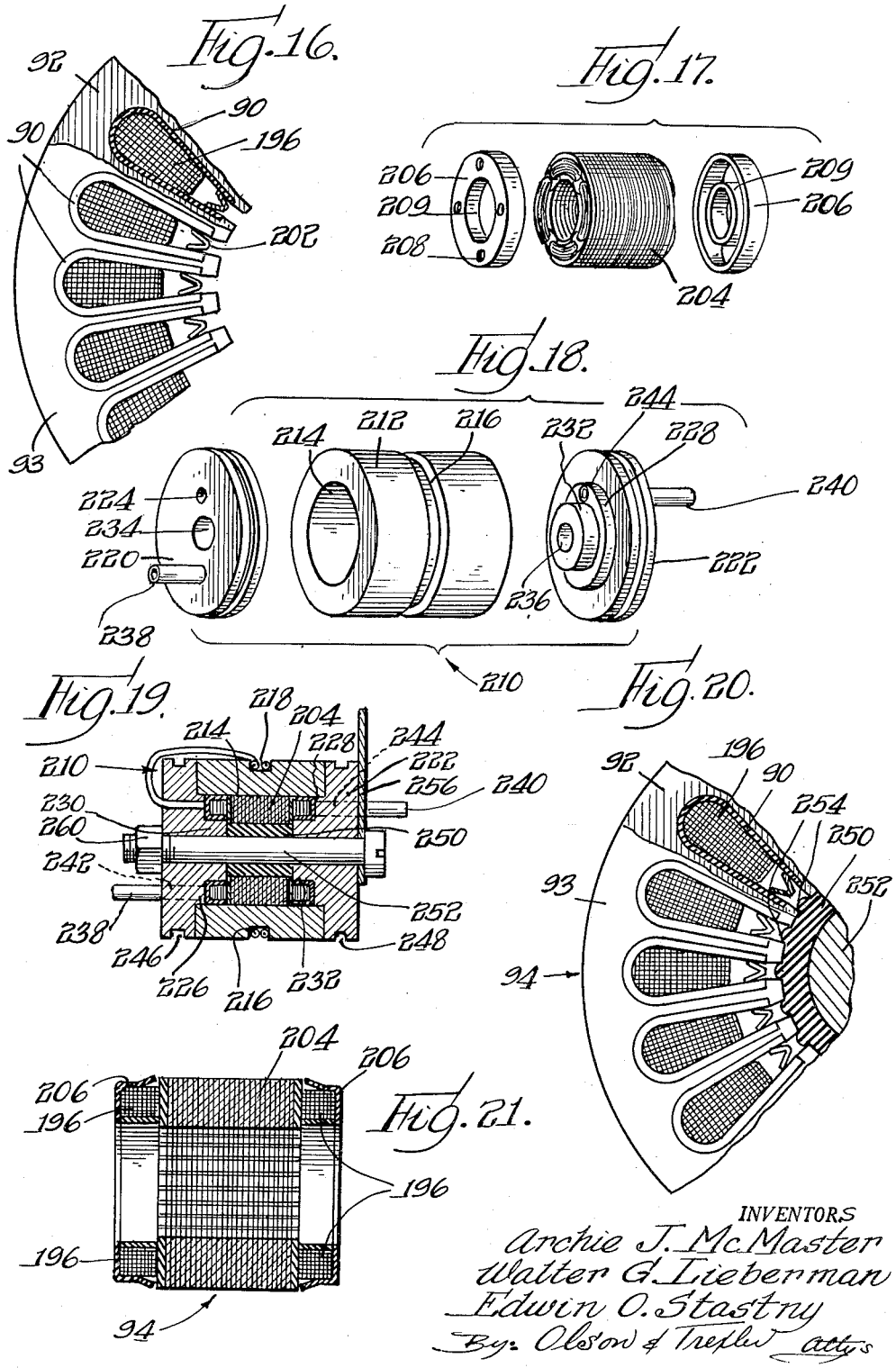

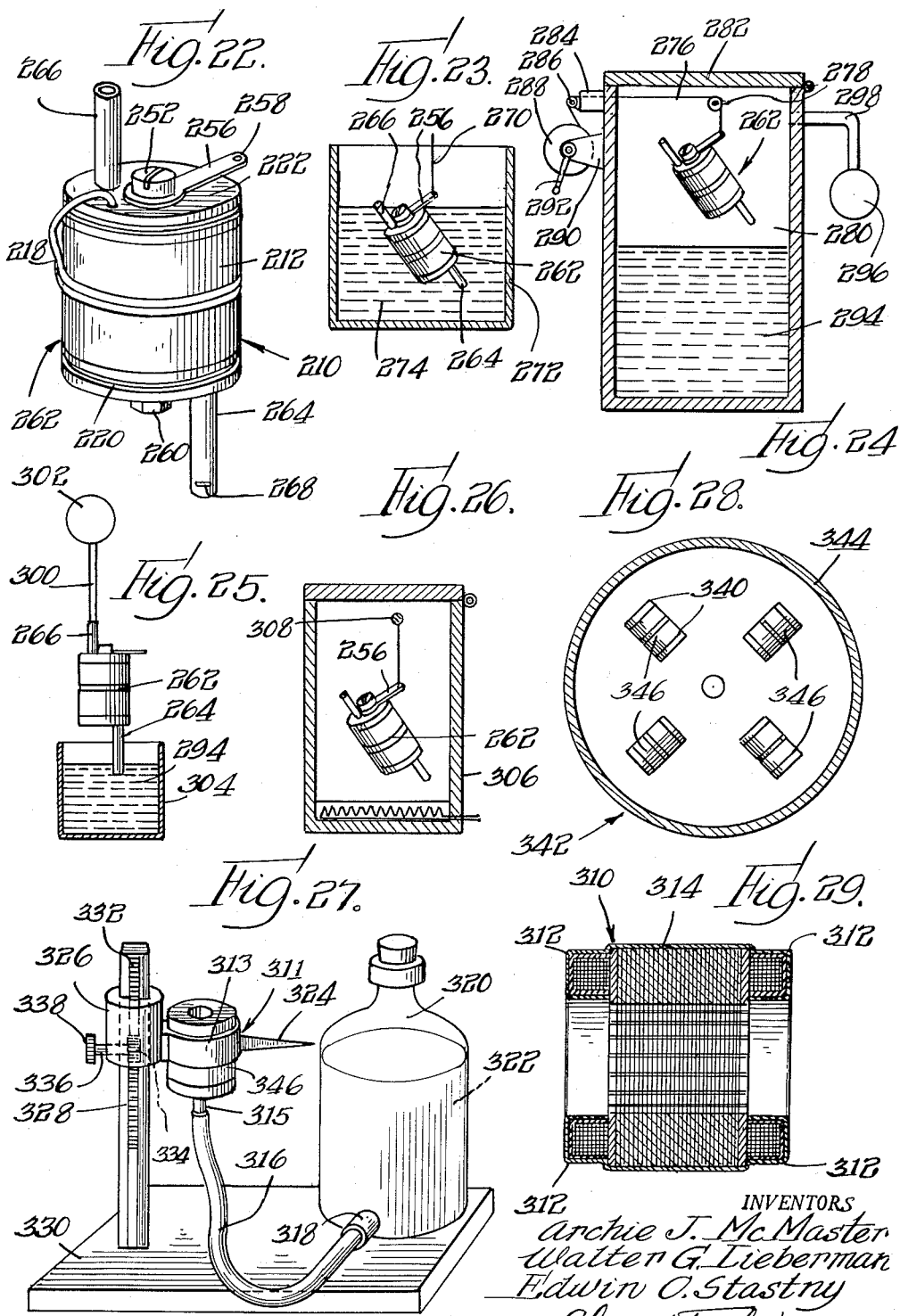

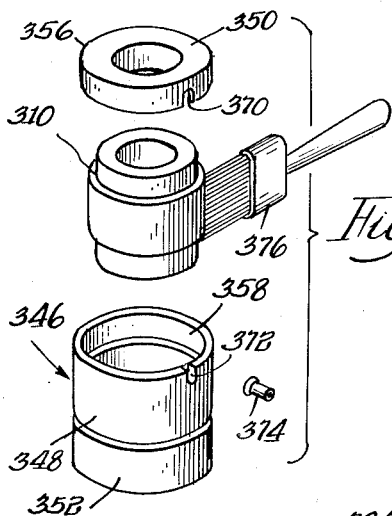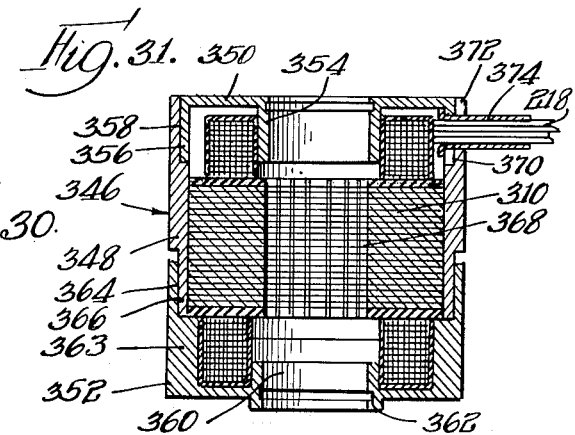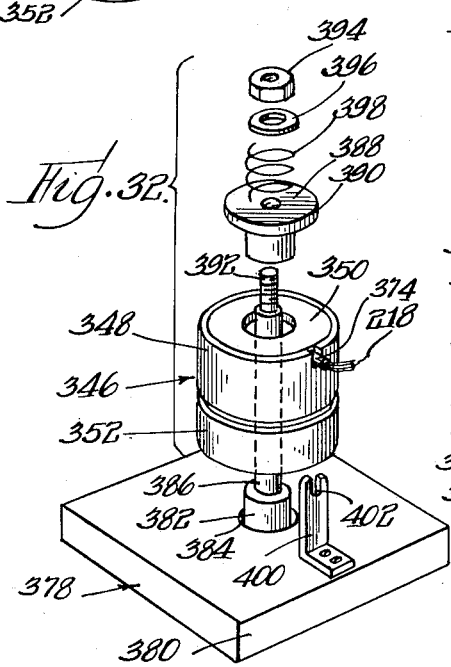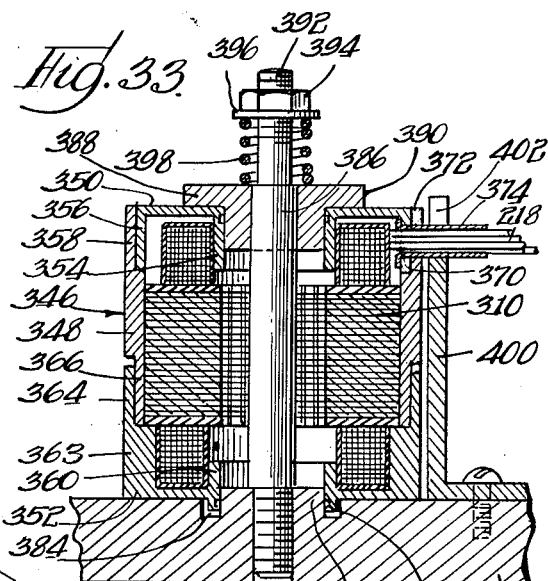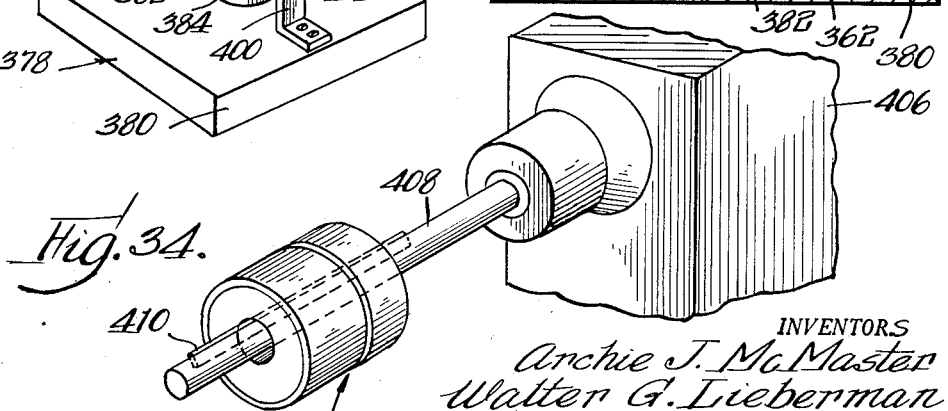

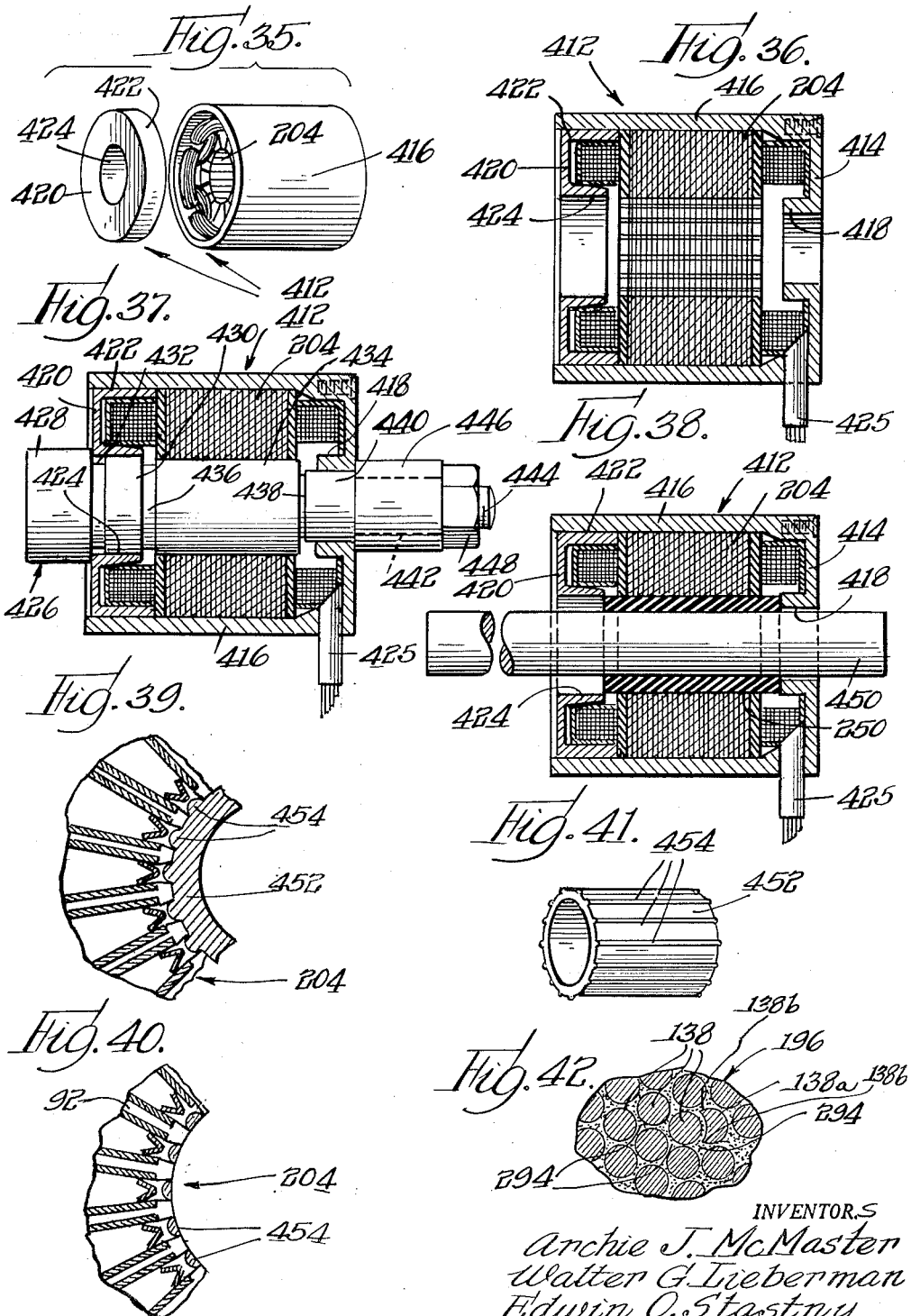

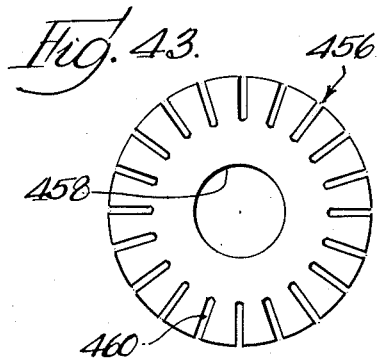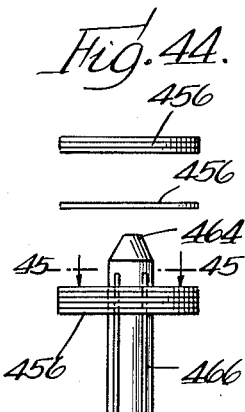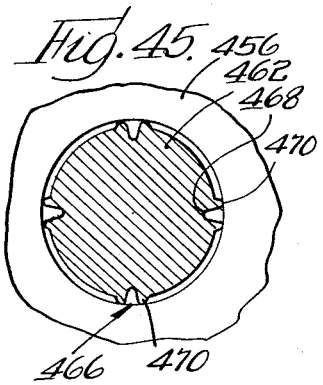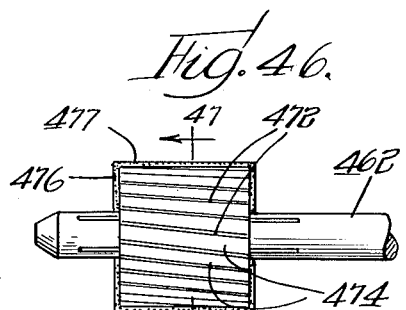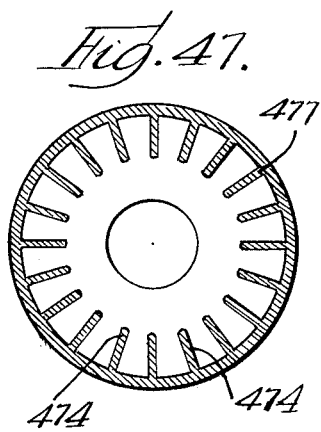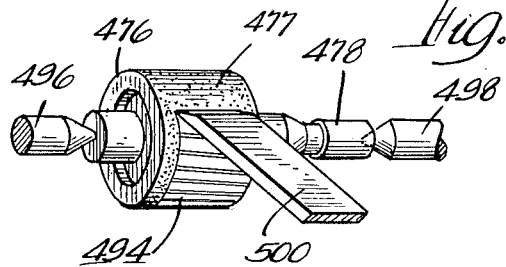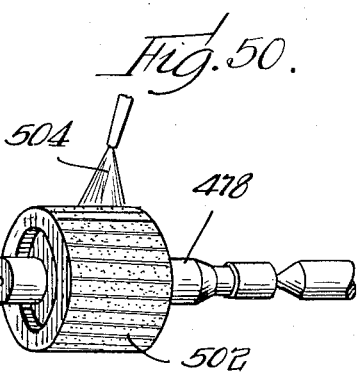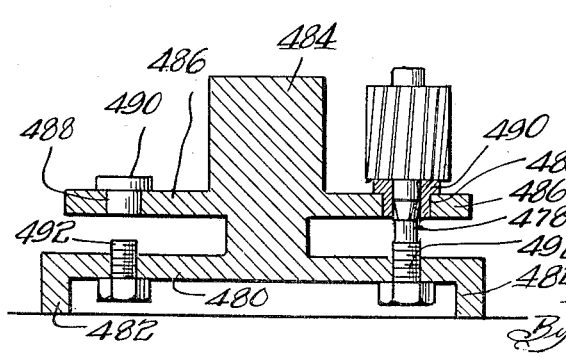

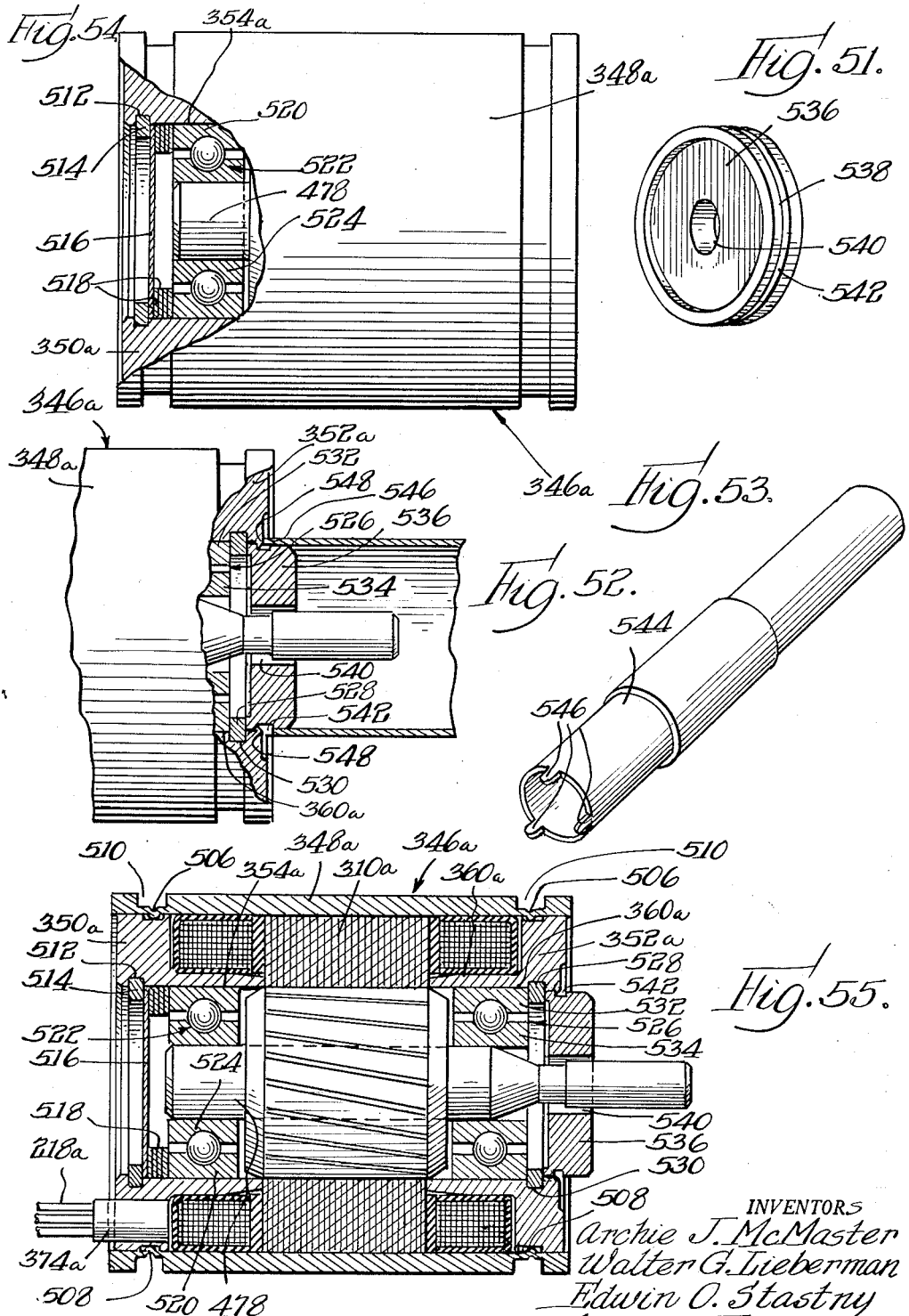

2,967,346

PROCESS FOR MANUFACTURING SMALL MOTORS

Archie J. McMaster, Deerfield, Walter G. Lieberman, Prospect Heights, and Edwin O. Stastny, Lombard, Ill., assignors to G-M Laboratories Inc., Chicago, Ill., a corporation of Illinois Filed Feb. 18, 1954, Ser. No. 411,126

7 Claims. (Cl. 29—155.5)

This invention is concerned with the manufacturing of small motors, particularly servo motors such as are used in aircraft.

Servo mechanisms are well known in the art and are used in manufacturing processes, and in many other applications such as gun sighting or aiming, gun control, and many other purposes in aircraft. Such motors used in aircraft must perform satisfactorily from arctic temperatures of about 70° below zero F. to extremely high temperatures, sometimes exceeding 300° F. caused by the heating of high speed airplanes as a result of air friction. Such aircraft motors must operate satisfactorily from sea level to extremely high altitudes where the air is so rarified that the insulating properties of the air are practically nil and cannot be relied upon. Small aircraft motors may rotate at 10,000–12,000 r.p.m., and in servo motors the torque must be absolutely uniform throughout the 360° rotatable positioning of the rotor.

In order to meet these requirements, there must be a very small air gap between the motor stator and rotor, and this gap must be absolutely uniform throughout, i.e. the rotor and stator must be manufactured to extremely close tolerances as to size and concentricity. There must be no possibility of movement of any part of the motor into the air gap between rotor and stator such as must be caused by expansion and contraction due to heating and cooling. This would result in improper operation or stalling of the motor. The motor must be insulated with material having excellent insulating qualities at high altitudes and temperatures, and also at very low temperatures.

Heretofore, these considerations have made the manufacture of servo motors and other small motors designed to exacting requirements extremely expensive. This expense has been engendered by the necessity of using special precision machine tools, and by the necessity of using wire having special insulation. It generally has been necessary to complete, or substantially to complete, the manufacture of a servo motor or other precision small motor before the electrical characteristics thereof could be tested. This has required discarding of an entire motor when an electrical fault has been discovered in the stator, and has greatly increased the cost of discarding a defective motor over what the cost would be if the stator alone could be discarded.

The principal object of this invention is to provide a new or improved process for manufacturing servo motors and other small precision motors to extremely close tolerances at substantially lower cost than heretofore thought possible.

A more specific object is to provide a process of manufacturing small motors wherein the most perfect concentricity possible is obtained.

A further object of this invention is to produce and assemble the motor parts to ordinary screw machine tolerances and to machine the motor as a unit to extremely close tolerances.

Another object of this invention is to provide a process of manufacturing small precision motors wherein the stator windows are completely filled with an insulating compound of improved characteristics affording corrosion resistance and efficient heat transfer in addition to insulating the coil windings in such manner as to allow the use of inexpensive wire.

Yet another object of this invention is to provide a process of manufacturing small precision motors wherein the parts are assembled and held together without the necessity of rotary fasteners or other studs which require the use of precision fasteners or studs and the provision of extremely precisely positioned and constructed apertures to avoid misalignment, thereby materially lowering the cost of manufacture.

A further object of this invention is to provide a process of manufacturing small precision motors wherein the stator and windings thereon are completed as a unit before assembly with a motor housing whereby the stator can be tested electrically before assembly with the housing, thereby requiring the discarding of a minimum of material if the stator and windings are found to be below standard electrically.

Another object of this invention is to mold the stator and windings with a polymerizable material securely fixing these parts together, insulating the wires, and providing an efficient heat transfer medium upon curing and polymerization of the material.

An alternative object of the invention is to provide a method of manufacturing small precision motors wherein the stator and winding are embedded within the motor housing by such polymerizable material.

A further object of this invention is to provide a process of manufacturing small motors wherein the stator laminations are held together before winding by improved insulating slot inserts, there being no studs required to hold the laminations together, improved electrical characteristics thereby being imparted to the stator.

A further object of this invention is to provide a process of manufacturing small motors incorporating a novel step for maintaining the stator windows clear and open at the internal diameter of the stator.

Yet another object of this invention is to provide a process of manufacturing small motors incorporating an improved method of applying fungicidal varnish to the motor without the danger of getting any of the varnish on an operator's hands.

A further object of this invention is to provide a process of manufacturing small motors wherein the stator and housing are cemented together, thereby obviating the necessity of conventional attaching means.

Yet another object of this invention resides in providing a process of manufacturing small motors wherein a locator hub is spun into place in one end of the motor housing.

Other and further objects and advantages of the present invention will be apparent from the ensuing description when taken in connection with the accompanying drawings wherein:

Fig. 1 is a diagrammatic showing of the steps of the motor manufacturing process;

Fig. 2 is a perspective view showing the heat and pressure formation of a slot insulator insert;

Fig. 3 is a cross-sectional view along the line 3—3 in Fig. 2 further illustrating the formation of the slot insulator;

Fig. 4 is a cross-sectional view along the line 4—4 of Fig. 2;

Fig. 5 is a perspective view of the finished slot insert;

Fig. 6 is a fragmentary axial view of one of the stator laminations showing the assembly therewith of a slot insulator;

Fig. 7 is a perspective view of a laminated stator and a jig showing an alternative method of forming the slot inserts;

Fig. 8 is a fragmentary sectional view taken along the plane of the axis containing the stator in Fig. 7 and showing the heat and pressure formation of an end of a slot insulator;

Fig. 9 is a perspective view illustrating the instrument or tool used for such formation;

Fig. 10 is a fragmentary view of a portion of a coil winding machine for winding wire on the stator;

Fig. 11 is an end view of the winding machine taken from the right end of Fig. 10;

Fig. 12 is a fragmentary front view of a part of the winding machine shown in Fig. 10;

Fig. 13 is an end view of the stator;

Fig. 14 is a view similar to Fig. 13 and showing one phase winding in place;

Fig. 15 is an end view of the stator similar to Figs. 13 and 14 showing both phase windings in place and illustrating the method of insulating the phase windings from one another;

Fig. 16 is a fragmentary sectional view through a stator having the coils wound thereon showing all of the parts in the stator windows;

Fig. 17 is an exploded perspective view of the wound stator and the end caps to be assembled therewith;

Fig. 18 is an exploded perspective view of the mold in which the polymerizable material is to be molded in the stator;

Fig. 19 is a longitudinal sectional view through the assembled mold and stator;

Fig. 20 is a fragmentary cross-sectional view on an enlarged scale illustrating the means by which the stator windows adjacent the inside diameter of the stator are maintained clear;

Fig. 21 is a cross-sectional view of the wound stator before molding;

Fig. 22 is a perspective view of the mold with the stator in place therein;

Fig. 23 is a cross-sectional view through an immersion chamber showing the coating of the mold with a plastic material;

Fig. 24 is a cross-sectional view through the molding chamber before immersion of the mold in the molding material for molding of the stator;

Fig. 25 illustrates an alternative method of introducing molding material into the mold;

Fig. 26 is a vertical sectional view through an oven wherein the polymerizable material is cured or polymerized;

Fig. 27 is a perspective view illustrating the apparatus for coating the inside of the stator with fungicidal varnish;

Fig. 28 is a top view partly in section illustrating the centrifuging of stators to remove excess varnish;

Fig. 29 is a cross-sectional view through the molded stator;

Fig. 30 is a perspective view showing the cementing of the molded stator for assembly with the housing;

Fig. 31 shows the housing with the stator inserted therein;

Fig. 32 is a perspective view showing a jig on which the housing and stator are assembled;

Fig. 33 is a longitudinal sectional view showing the stator and housing in place on the jig;

Fig. 34 is a perspective view showing the honing of the assembled motor housing and stator;

Fig. 35 illustrates a modification of the invention and specifically illustrates a two-piece housing;

Fig. 36 is a longitudinal sectional view showing the two-piece housing assembled with a stator;

Fig. 37 is a longitudinal sectional view showing the assembled housing and stator temporarily assembled with the arbor upon which they are mounted for introduction of the polymerizable material;

Fig. 38 is a view similar to Fig. 37 showing another arbor and rubber tube in place;

Fig. 39 is a cross-sectional view through a stator prior to molding showing modified means for maintaining the stator windows clear adjacent the inside diameter of the stator;

Fig. 40 is a view similar to Fig. 39 after the body of the tube has been machined or ground from place;

Fig. 41 is a perspective view of the spline to be used in this modification;

Fig. 42 is a sectional view taken through a coil window illustrating the wires therein and showing the association of the molding compound therewith;

Fig. 43 shows a rotor lamination;

Fig. 44 shows the stacking of rotor laminations on an arbor;

Fig. 45 is a cross-sectional view along the line 45—45 of Fig. 44 through the arbor;

Fig. 46 is a side view of the rotor mounted on the arbor and showing the conductors cast in place;

Fig. 47 is a cross-sectional view through the rotor with the conductors cast in place taken along the line 47—47 of Fig. 46;

Fig. 48 is a sectional view showing the manner in which the rotors are assembled with their shafts on a jig;

Fig. 49 is a perspective view showing the finishing of the rotor;

Fig. 50 is a perspective view of the rotor showing painting thereof;

Fig. 51 is a perspective view of a locator hub to be assembled with the housing;

Fig. 52 is a longitudinal sectional view showing the spinning of the locator hub in place;

Fig. 53 is a perspective view of the spinning tool;

Fig. 54 is a side view of the motor housing with a portion broken away showing assembly of the bearings at one end thereof with the housing; and Fig. 55 is a longitudinal sectional view of the completed motor.

Referring first to Fig. 1 for a general understanding of the invention, there will be seen a block diagram illustrating the various steps in the process of manufacturing a small motor in accordance with the principles of this invention. As illustrated at the upper left-hand corner of Fig. 1, the laminations going to make up the stator first are stacked together. The method or steps wherein the stator is stacked will be illustrated hereinafter in greater detail. At the next station the coils are wound on the stacked stator. From the coil winding station the wound stator is acted upon slightly differently depending upon which of two embodiments of the process is employed.

According to the preferred embodiment, the wound coil is assembled with a mold, and this mold is moved along to another station wherein a polymerizable resin is injected into the mold about the coil windings, and then is cured or polymerized to harden the resin, thereby retaining the stator and windings as a unit. The molded and cured stator and windings then are cemented in place in a housing, and the cement is suitably heat treated to cure the same whereby the cement is hardened and the stator and windings are firmly secured within the housing.

The steps up to this point are performed with parts having ordinary screw machine tolerances. The assembled housing and stator then is moved along to station No. 5 whereat the bearing seats in the motor housing and the internal diameter of the stator are simultaneously honed on a precision honing machine. The honing tool extends completely through the housing and stator, simultaneously honing all of the interior surfaces to obtain extremely close tolerances and perfect concentricity, and this process hereinafter will be referred to as "through honing." The honed stator and housing then are passed on to station No. 6 for final assembly with the bearings and rotor.

According to the modified form of the process, the stator with the coils wound thereon passes from station No. 2 to station No. 3' where it is assembled with a housing. The assembled housing and wound stator then are passed on to station No. 4' whereat the stator is embedded in the housing by the introduction of the same polymerizable resin used in the molding at station No. 4. The embedded housing and stator then are heat treated to polymerize the resin as in the preferred embodiment previously disclosed. The embedded housing and stator then may be passed on to station No. 5 for honing, or under some circumstances, such as when the bearing seats in the housing and the internal diameter of the stator are not identical, the embedded stator and housing may be passed directly on to station No. 6 for final assembly as indicated by the fine line.

In the lower left portion of Fig. 1, there is indicated a station A where the laminations going to form the rotor are stacked. The stacked rotor laminations then have conductors cast in place therein at station B and the cast rotor then is mounted on to a rotor shaft at station C, and the rotor on the shaft then is machined to the necessary close tolerances and to attain perfect concentricity at station D. The machined rotor then is passed on to station No. 6 for final assembly with the motor housing, stator, and bearings.

Station No. 1

It has been mentioned heretofore that slot insulators or inserts are utilized to insulate the stator windings from the stator, and at the same time to hold the laminations stacked together. The formation of such slot inserts is illustrated in Figs. 2–5 for a relatively large motor, i.e. one having a diameter on the order of an inch and a half, while the formation of slot inserts for a relatively small motor, i.e. one having a diameter on the order of one inch, is shown in Figs. 7–9. Referring first to Fig. 2, there will be seen a flat sheet or blank 60 of suitable insulating and formable qualities. As a specific example, nylon has been found to be an excellent material for this use. The blank 60 is formed under heat and pressure in a machine partially illustrated in Fig 2 and including a vertically reciprocable ram 62 carrying a punch or forming tool 64. The ram and punch may be heated by any suitable means such as electromagnetic induction, or by electrical resistance heating, or by any other means, or may be left unheated. In this latter instance, the blank 60 would be heated by means such as electrostatic heating, or sufficient heat could be supplied from the die 66 shown directly beneath the ram and punch. The die 66 is provided with a slot 68 (see also Figs. 3 and 4) aligned with the punch 64. Spring-pressed plungers 70 in the slot 68 normally extend up through the top surface of the die 66, and are retractable against their springs 72 as the punch 64 extends into the slot. The plungers serve to maintain the blank 60 firmly against the punch for proper formation of the blank to prevent sliding of the blank along the punch with a resulting asymmetrical slot insert. A locator plate 74 is secured on top of the die 66 by any suitable means such as screws 76 and has a rectangular central aperture 78 complementary to the blank 60 for properly positioning the blank. When the punch descends into the slot 68, it forms the blank 60 into a generally U-shape as best may be seen in Fig. 4, it being noted that the bottom end of the punch is semi-cylindrical as at 79. The top surfaces of the plungers 70 are flat as it is not desired that the bight portion of the U-shaped blank should remain as a perfect semi-circle as will be apparent later.

When the blank 60 has been deformed under heat and pressure to the U-shape shown, it being understood that the die per se preferably is heated electrically by resistance or induction principles, two additional rams 80 are moved in toward the die from opposite ends thereof. These rams 80 are provided with projections 82 on their working faces which engage within opposite ends of the U-formed blank and bend them outwardly as at 84 where they are pressed against the ends of the die 66 by the working face 86 of the rams 80. The rams are heated electrically by means such as coils illustrated at 88 so as permanently to deform the ends of the blank 60 as shown at 84. Upon retraction of the rams 62 and 80 the plungers 70 push the formed blank from the slot. The formed blank now comprises a substantially V-shaped slot insert 90 as shown in Fig. 5 having right angularly disposed end flanges 84. It will be appreciated that the absence of a semi-cylindrical concave section in the die 66 complementary to the cylindrical portion 79 of the punch 64 results in a permanent deformation of the blank into a curve slightly less than a semicircle thereby producing the V-shaped slot insert 90.

The shape of a stator lamination 92 may be seen in Fig. 13 which is an end view of the stator 94, and a portion or fragment thereof, may be seen in Fig. 6. The lamination is of conventional configuration having circular inner and outer peripheries and teeth 96 spaced by slots or notches 98. As may be seen best in Fig. 6, the teeth are provided near their inner ends or extremities with shoulders 100. A sufficient number of laminations are stacked together to form a stator, such number generally being determined by weighing the laminations to attain a predetermined stator weight, rather than individually counting the laminations. The stacked stator laminations are held in the hand of an operator, and slot inserts 90 successively are manually bent to a tight configuration and are slipped into the windows 102 formed by the slots or notches 98 of the stacked laminations. The inserts 90 are inserted into the stacked stator including insulating laminations 93 on either end thereof and formed of any suitable material such as fiber from the end of the stator, and upon release by the operator spring out to the shape shown in Fig 6 with the end flanges 84 thereon overlying the outer laminations and trapping all of the laminations in stacked array. The inserts or insulators 90 tend to spring out to the U-shape shown in Fig. 5, and in so doing accurately align all of the stacked laminations The slot insulators or inserts for the small motors, i.e. those having a diameter on the order of 1 inch, are formed somewhat differently. The stator laminations 92a are stacked together with insulating laminations 93a at the ends thereof on a jig 104 shown in Fig. 7. The jig 104 comprises a ring 106 having a pair of pins 108 upstanding therefrom and adapted to project through the stator windows 102a. Suitable insulating material such as mylar, as used in the previous embodiment, is preformed in ribbon-form having a substantially C-shaped cross section. The C-shaped ribbon is cut off into suitable lengths to form slot insulators 90a and these are slipped into the stator windows with the stator on the jig 104. The opposite ends of the slot insulators then are turned over under heat and pressure by a tool 110 to form retaining flanges 84a.

The tool 110, as shown in Figs. 8 and 9, comprises a cylindrical nose 112 having a rounded tip 114. The nose projects longitudinally from a cylindrical portion 116 at the front portion of a metallic housing 118 containing an electrical heating coil. The tool 110 is provided with a handle 120 of suitable heat insulating material such as wood, and an electrical supply cord or line 122 extends through the handle and is connected with the heating coil. The junction between the nose 112 and the cylindrical portion 116 provides a forming shoulder 124 which impinges against the end of each slot insulator 90a with the nose 112 within the insulator whereby to form the flanges 84a under heat and pressure.

Station No. 2

The stator, held together by the nylon slot inserts, then is wound with suitable coils, and this step or method may be substantially identical regardless of the manner in which the slot insulators or inserts are formed.

More particularly, the coil winding is effected by means of a coil winding machine 126 shown in Figs. 10–12. The stator illustrated with regard to coil winding is for a servo motor, and accordingly there are two phase windings provided. The winding machine or apparatus 126 comprises a flat bed or base 128 on which is mounted an upstanding block 130 which supports a winding head 132. The winding head 132 is mounted on the end of a hollow tube 134 projecting through the support block 130. The tube is adapted to reciprocate through the block 130 and to rock through a predetermined arc, all in accordance with a predetermined pattern.

The head 132 is hollow and is provided with a radially projecting member 136 having a radial slot therein communicating with the interior of the head. Wire to be wound on the stator is fed from a suitable supply spool (not shown) through the hollow tube 134 into the interior of the head 132, and from there out through the slot 136 as indicated at 138 for winding on the stator.

The stator 94 to be wound is supported in a clamping mechanism 140. The clamping mechanism 140 includes a block 142 suitably affixed to the base or table 128. This block has a concave upper face 144 complementary to the exterior of the stator. A rigid strap 146 is affixed to the side of the block 142 by suitable means such as a bolt 148 and is provided with an arcuate upper end 150 complementary in part to the periphery of the stator. A flexible metal strap 152 is secured to the extremity of the arcuate portion 150 of the rigid strap 146 and is affixed at its opposite end to a hinge 154 adjacent the side of the block 142. The hinge 154 further is connected to a somewhat flexible metallic strip 156 which is anchored at the opposite end to posts 158 on the table 128 by means such as screws 160. It will be understood that the posts 158 could be cylindrical spacers and that the screws 160 could extend through them and be threaded into the plate or table 128.

A boss 162 is formed on or suitably affixed to the base, plate or table 128 beneath the strip 156 relatively near the hinge 154 and of substantially the same height as the posts 158. A stud 164 extends through the strip 156 and is threaded into the boss 162. A flange 166 bears against the top of the strip 156 for clamping the same against the boss 162 when the stud 164 is threaded into fully seated position. A cross pin 168 is provided at the upper end of the stud 164 to facilitate rotation thereof. It will be appreciated that the stud 164 is backed off to allow upward movement of the strip 156 for slackening the flexible strap 152 in order to insert a stator beneath it and the arcuate portion 150 of the rigid strap 146 and on the concave surface 144 of the block 142. Subsequent threading of the stud 164 into fully seated position forces the strip 156 down to pull the flexible strap 152 tightly against the stator to clamp the same in position.

A support bar 170 is positioned on top of the rigid strap 146. The bar 170 is positioned by a recess 172 therein which snugly receives the rigid strap 146, and is affixed to this strap by means such as a bolt 174 passing through the support bar and threaded into the rigid strap 146. The ends of the support bar 170 extend outwardly a substantial distance beyond the rigid strap and are provided with axial, threaded apertures 176 receiving bolts 178 which preferably are provided with knurled heads 180. The axial apertures 176 terminate in vertical slots 182 extending through the support bar 170. The upstanding ends 184 of a pair of wire guides 186 extend through these slots and are releasably clamped in place by the bolts 178. These wire guides are provided with arcuate sections 188 immediately adjacent the vertical ends 184. The arcuate portions terminate in upward projections or stops 190 from which the wire guides are inclined downwardly as at 192. The downwardly inclined surfaces project radially inwardly of the inside diameter of a stator 94, while the U-shaped portion 188 of each guide is positioned adjacent the diameter of the coil winding windows.

The coil winding machine or apparatus is completed by a C-shaped tube 194 which extends axially through the stator and beyond the extremities of the wire guides 186, the inclined portions 192 of the wire guides projecting down into the tube 194 through the longitudinal opening 195 therein. The C-shaped tube 194 fits snugly within the interior of the stator, and for this purpose is preferably somewhat resilient so that it may be partially collapsed for ready insertion within the stator after the stator has been clamped in place.

The stator 94 is clamped in the clamping mechanism 140 with a pair of slots in which a winding is to be wound symmetrically arranged relative to the wire guides 186. In the specific case of the servo motor herein illustrated, each winding goes through a pair of windows spaced apart by two windows. The tube 134 and head 132 are radially positioned so as to lie on one side of the wire guides and the head is moved axially through the stator. The tube and head then are rocked so as to be arranged at a similar angle on the opposite sides of the wire guides 186, and the head is reciprocated back through the stator to the position shown in Fig. 10. The rocking of the head and reciprocation thereof after insertion through the stator causes the wire 138 to catch over the deflecting portion 192 of the outermost wire guide, and then to pull back into the looped portion 188 beyond the stop 190. Subsequent rocking of the tube and head to the initial position and movement back through the stator causes the wire to pass similarly over the nearer wire guide (the lefthand wire guide in Figs. 10 and 12). Continued operation in this manner produces a coil winding such as one of the coil windings 196 as shown in Fig. 14. The bolts 178 then are loosened and the wire guides are radially withdrawn. The stud 164 is partially unscrewed, and the stator is rotated the necessary degree to position it for winding another coil of the same phase, the wire remaining unbroken. The C-shaped sleeve sleeve 194 is then turned to its initial position, and the wire guides are replaced. The winding head 132 then is operated as before to produce another one of the coils 196. This procedure is followed until the necessary number of coils for one phase winding are completed, there being four such coils in the illustrative example.

The wire then is cut off and the second phase winding 198 is wound on the stator in the same manner as the coils of the first phase winding. Prior to the winding of the second phase winding 198, the phase winding 196 is wound with a special plastic insulating tape 200 to insulate the phase windings from one another as shown in Fig. 15. The loose end of the tape is shown in Fig. 15 for illustrative purposes, and in actual practice is tucked tightly out of the way. It will be understood that the tape is applied at the opposite ends of the stator where this phase winding projects from the stator.

The coil winding is finished by attaching lead wires to the coil wires. The lead wires will be referred to and illustrated hereinafter. A further step in the coil winding insures retention of the coils in the windows. As shown in Fig. 16, a V-shaped fish paper slot stick 202 is wedged in each window adjacent the inside diameter of the stator. This slot stick acts to retain the wires in the window and also coacts with the slot insulator 90 to insulate the wires 138. At this point it might be well to note that the wire 138 used in forming the stator windings is coated magnet wire of the type readily available in commerce at a relatively low price.

*Station No. 3*

After the coils have been wound on the stator, the fish paper slot sticks have been wedged in place, and 240. The tubing 266 is connected to a glass conduit or tube 300 leading to an evacuating pump 302, and the rubber tubing 264 is placed with its open lower end beneath the surface of the polymerizable resin 294 in a suitable container 304. Pressure is reduced by the pump and this causes the liquid resin to rise from the container 304 into the mold 262 and eventually into the glass tube 300. The resin will be observed when it enters the glass tube 300, and the pump may be turned off and the rubber tubing 264 removed from the liquid resin 294, as the mold and stator now are full of the resin.

Regardless of which sequence is performed for filling the mold and stator with resin, the filled mold then is hung within an oven 306 by means such as a rod 308 having suitable fasteners thereon for engaging the supporting straps 256. The mold and stator then are heated within the oven for a predetermined time at a predetermined temperature in order to cure or polymerize the polymerizable resin. Following such polymerization, the plastic coating on the outside of the mold is peeled off and the mold is disassembled from the stator.

The molded stator, hereinafter referred to by the numeral 310, as it is removed from the mold appears as shown in Fig. 29. The edges of the molded stator now are relatively squared off as at 312, and the stator takes the form of an integral unit. Much of the polymerized material is located in among the wires in the stator windows and otherwise fills the stator windows except for the portions protected by the extruded ribs 254 on the rubber tube 250, but there is also a thin film of the material as at 314 covering the stator except for the inside diameter thereof. This material aids the slot insulators and coil windings in maintaining the stator laminations stacked together.

Station No. 4a

After the completion of the molding and centrifuging, the mold is disassembled from the stator and the stator is assembled with the housing. The housing 346, as shown in Figs. 30–34 is made in three pieces including a central body portion 348, a rear end bell 350, and a front end bell 352. The rear end bell 350 is provided with a central cylinder forming a bearing seat 354, and with a peripheral cylindrical flange 356 which fits snugly within a relieved or shouldered portion 358 at the end of the body portion 348. The front end bell also is provided with a central cylinder forming a bearing seat 360. This cylinder also projects beyond the outer face of the end bell and forms a locator hub 362, although it is possible that the locator hub can be formed separately as will be brought out hereinafter. The front end bell 352 also is provided with a circumferential flange 363 which is internally shouldered or relieved as at 364 snugly to receive an internally shouldered or relieved portion 366. According to the preferred form of the invention, the inside diameter 368 of the molded stator is identical with the inside diameter of the bearing seats 354 and 360.

It will be understood that the lead wires 218 can be taken from the housing either radially thereof, or through the end thereof. As shown in Figs. 30–33 the lead wires are taken out radially. For this purpose, the rear end bell flange 356 is provided with a U-shaped slot 370 cooperable with a reversely directed slot 372 in the central body portion 348 of the housing to form an aperture in which is received a bushing or thimble 374 projecting radially from the housing and through which the lead wires 218 are passed.

Before assembly with the housing 346, a cement is brushed on the molded stator 310 by means of a brush 376 as shown in Fig. 30. This cement may be the same material as the polymerizable resin utilized in molding the stator. The housing and stator are assembled on a jig 378 shown in Figs. 32 and 33. The jig comprises a flat plate or base 380 having a plurality of bosses 382 projecting upwardly therefrom and surrounded by circumferential recesses 384. The bosses are of exactly the right size to fit within the bearing seats 360, while the recesses 384 receive the locator hubs 362. The jigs further are provided with studs 386 threaded into the bosses 382 and projecting coaxially upwardly therefrom through the stator and housing. A plug or bushing 388 fits over each stud with a very fine tolerance and fits into one of the bearing seats 354 with an equally fine tolerance, while a circumferential flange 390 on the plug or bushing overlies the outer face of the rear end bell. Each stud 386 is reduced in diameter above the bushing or plug 388 as at 392, and is threaded along this reduced portion. A nut 394 threaded on this portion bears against a washer 396 to compress a coil spring 398 encircling the reduced diameter portion 392 against the top of the plug or bushing 388 whereby to clamp the housing together while the cement is cured. The jig further is provided with an angle bracket 400 fixed to the base 380 adjacent each boss 382 and having a U-shaped slot 402 in the upper end thereof for positioning the thimble or bushing 374. The entire jig with the housing and stator mounted thereon preferably is placed in an oven, somewhat similar to the oven shown in Fig. 26 for curing or polymerizing the cement securely to bond the housing together and to the stator.

Station No. 5

The precision fit of each boss 382 into a housing front end bell bearing seat, and the precision fit of each bushing 388 on its stud 386 and the rear end bell bearing seat, and the close fit of the molded stator 310 within the housing results in a stator and bearing seat construction which is concentric within ordinary screw machine tolerances. Further accuracy is obtained by simultaneously honing through both bearing seats and the inside diameter of the stator. After the cement has been thoroughly cured or polymerized, the assembled housing and stator, hereinafter identified by the numeral 404, are honed on a precision honing machine 406 (Fig. 34). Precision honing machines are readily available in commerce and include a rotary shaft 408 and a honing stone 410 extending longitudinally of the shaft and spring pressed outwardly therefrom. The housing and stator unit 404 is manually held about the shaft 408 with the honing stone 410 simultaneously engaging both bearing seats and the inside diameter of the stator. The diameter of the bearing seats and the inside diameter of the stator are periodically checked on any suitable gage, an air gage being satisfactory, until they have achieved a predetermined value to extremely close tolerances. The simultaneous honing of the stator and of the bearing seats insures substantially perfect concentricity thereof.

After completion of the through honing, the inside diameter of the stator is coated with a fungicidal varnish. Such varnish coating is shown in Figs. 27 and 28.

The varnish used is extremely hard on human skin, and consequently it is most important that the skin is not contacted by this varnish. As shown in Fig. 27 the assembled stator and housing 346 are placed in a bracket 311 comprising an arcuate arm 313 partially encircling the mold, and an arm beneath the mold (not shown). Before insertion in this bracket a relatively rigid tube 315 is inserted in one of the bearing seats as 360. This tube maintains the bearing seat free of varnish. The relatively rigid tube 315 is secured to a flexible tube 316 connected to an outlet 318 at the bottom of a bottle 320 or other suitable receptacle containing the fungicidal varnish 322.

The bracket 311 includes a pointer 324 projecting toward the bottle 320 to aid in judging the height of the bracket relative to the varnish level, and further includes a sleeve 326 encircling a post 328 upstanding from a flat base or table 330. The post 328 is provided with a rack 332, and a pinion 334 fixed on a shaft 336 journaled in a portion of the sleeve 326 and rotatable by a knob the ends of the coil of one phase winding have been wrapped with tape, the stator is assembled with a mold, and then is molded into an integral unit with a polymerizable resin. The stator with the windings thereon, hereinafter identified by the numeral 204, first is assembled with a pair of end caps 206 as shown in Fig. 17. These end caps are made of any suitable material, such as impregnated insulating paper, and are ring-like in configuration. The end caps 206 are generally U-shaped in cross section and are provided in the bight thereof with a plurality of spaced apertures or perforations 208 for passage of the impregnating compound. It will be understood that each end cap can be made integral as shown, or that the inner cylindrical portion 209 could comprise a separate part. The end caps are secured on the wound stator 204 by a few drops of cement and take the general form illustrated in Fig. 21.

The mold 210 with which the wound stator is assembled is shown in perspective in Fig. 18 and in cross section in Fig. 19. The mold comprises a central cylindrical section 212 having an inside diameter 214 forming a close fit with the outside of the stator, but leaving a small clearance between the stator and mold when they are arranged concentrically. The central cylindrical mold section 212 further is provided with a central circumferential groove 216 in which the lead wires 218 are wound to keep them out of the way during the molding operation. These wound wires are held in place in the groove 216 by any suitable means such as a strip of tape. The mold is completed by a pair of end sections 220 and 222 which are similar except for the provision of an aperture 224 in the end section 220 for permitting the lead wires to extend outwardly from the mold. Both of the end sections comprise circular plate-like portions having circular shouldered projections 226 and 228 which are of the proper diameter to fit snugly within the central cylindrical portion 212. The end sections further comprise central cylindrical bosses 230 and 232 which are adapted to fit within the projecting ends of the coil windings and substantially up against the stator laminations. The end sections further are provided with central bores 234 and 236 extending axially therethrough, and the end sections are completed by filler tubes 238 and 240 communicating with bores 242 and 244 extending through the end pieces to provide communication with the interior of the mold. It further will be noted that each end section is provided with a peripheral groove 246 and 248 to facilitate gripping the mold for separating the same after the molding.

As hereinbefore noted, the stator windows are kept open adjacent the inside diameter of the stator in order to preclude the possibility of movement of material into the air gap between the stator and rotor as a result of expansion and contraction with temperature changes. As shown in Figs. 19 and 20, this clearance is maintained by inserting a rubber tube 250 into the central opening of the stator. This tube is of at least the same length as the stack of stator laminations and has an outside diameter substantially the same as the inside diameter of the stator. The tube is constructed of rather soft gum rubber and is available in commerce at a very low price, and all that is necessary is to cut it to length and insert it in a stator. After the tube is inserted in the stator, the stator is assembled with the mold as shown in Fig. 19, and a bolt 252 is passed axially through the mold and through the tube. The bolt is slightly larger in diameter than the inside diameter of the tube and consequently expands the tube slightly. This expansion of the tube forces it tightly against the inside diameter of the stator, and extrudes it part way into the stator windows forming ribs 254 on the tube as shown in Fig. 20. This tube prevents the molding compound shortly to be discussed from entering the stator windows near the inside diameter, and also maintains the inside diameter of the stator substantially free from the material. Before insertion of the bolt 252 through the mold and tube, it is passed through one end of a strip 256 having an eyelet 258 at the other end for suspending the mold and stator. A nut 260 is threaded on the opposite end of the bolt to clamp the mold securely together about the stator.

The mold with the stator inside it is shown in perspective in Fig. 22.

The assembled mold and stator, which hereinafter will be referred to by the numeral 262, is treated to prevent adherence of the molding compound to the exterior of the mold. This is done by slipping short lengths of rubber tubing 264 and 266 respectively over the projecting filler tubes 238 and 240. The end of the lower tube 264 as shown in Fig. 22 is closed off by means such as a wire staple 268. The assembled mold and stator 262 with the rubber tubing 264 and 266 in place then is suspended by a suitable cord or wire 270 affixed to the strip 256 in a tank or container 272 containing a plastic material. This plastic material is of a type which will coat the exterior of the mold, and which will dry when exposed to the air to form a coating which can be stripped from the mold at a later time. Many suitable plastic materials are well known, and include those widely used for "moth balling" military supplies. After the assembled mold and stator 262 have been immersed in the plastic material 274 for a predetermined time, they are removed therefrom and air dried. It will be apparent that a large number of assembled molds and stators can be immersed at the same time and then dried together to speed production. After the plastic coating has been dried or cured, the closed end of the rubber tube 264 is cut off by any suitable means, such as by a pair of scissors. By the sequence just set forth, the complete mold can be immersed and coated with the plastic material while leaving openings through the rubber tubing 264 and 266 into the interior of the mold.

The plastic coated mold and assembled stator 262 then is suspended from a cable or the like 276 which is passed over a pulley 278 within a vacuum chamber 280 having a hinged or removable top or lid 282. The cable 276 passes out of the vacuum chamber 280 through a packing gland 284 and over a pulley 286 to a reel 288 mounted on the side of the chamber by means such as a bracket 290 and rotatable by means such as a hand crank 292. It will be appreciated that any other suitable means could be used for raising and lowering the mold and stator 262 within the housing while maintaining the interior of the housing sealed from the outside air. The bottom of the housing is filled with a polymerizable resin 294 in a liquid state, and a pump 296 is connected with the interior of the chamber above the liquid level by means of a line or conduit 298. The mold and assembled stator 262 are introduced into the chamber with the interior of the chamber at atmospheric pressure. The lid of the chamber then is closed and the mold and stator are suspended above the liquid polymerizable resin and the chamber is evacuated by means of the pump 296 to a pressure substantially below atmospheric. After a predetermined length of time to make sure that the pressure within the mold has dropped to this subatmospheric pressure, the mold and stator are lowered by means of the reel 288 into the liquid resin. The mold and stator are left beneath the surface of the resin for a predetermined time, and pressure is gradually built up within the chamber to substantially above atmospheric. After a predetermined time at this increased pressure the pressure is released, the tank is opened and the mold and stator are raised and lifted from the chamber. The interior of the mold and all of the parts of the stator now are thoroughly filled with the liquid polymerizable resin.

An alternative step for introducing the resin into the interior of the mold is shown in Fig. 25. In this alternative step, it is not necessary to coat the mold and assembled stator with plastic material, but the rubber tubing 264 and 266 is placed over the filler tubes 238 and 338 is engaged with the rack 332 for vertically adjusting the height of the bracket 311. When the mold and stator are inserted in the bracket 311, the bracket is above the level of the varnish 322 in the bottle or container 320. The knob 338 then is rotated to lower the bracket through the rack and pinion arrangement so that the varnish 322, seeking its own level, will move up through the inner diameter of the stator. When the varnish appears in sight at the top of the stator, but before it touches the upper bearing seat, as 354, lowering of the bracket is stopped. After a short time the bracket is raised, and the housing and stator are removed from the bracket and from the relatively rigid tube 315.

The mold and housing are allowed to drain a short time, and then are transferred to suitable brackets 340 in a centrifuge 342 having a circular outer wall 344. The centrifuge is rotated at a rapid rate by any suitable means to displace most of the varnish from the inside diameter of the stator, leaving only a thin film of varnish thereon.

Station No. 3'

In certain instances, and for some requirements such as affixing a gear train in an auxiliary housing on the outside of the motor housing, it is necessary that one of the bearing seats be of a different diameter than the other, or at least one of the bearing seats must be of a different diameter than the inside diameter of the stator. With such a construction, the through honing is not possible. Concentricity to desirable standards is obtained in this circumstance by pre-honing the stator and bearing seats, by using a two-piece housing, and by assembling the housing and stator on a special precision arbor. The housing and stator are assembled by cementing the stator, and the stator then is embedded in place in the housing by the same molding compound heretofore disclosed for molding the stator.

The two-piece housing 412 as shown in Figs. 35–38 is constructed with the front end bell 414 integral with the cylindrical body portion 416. A bearing seat 418 of relatively small diameter is formed integral with the housing body portion and front end bell, and is pre-honed before assembly. The rear end bell 420 is provided with a circumferential, axially directed flange 422 which fits rather closely within the body portion 416. A relatively large bearing seat 424 is formed integral with the rear end bell 420 and is pre-honed to precise tolerances before assembly. The inside diameter of the stator also may be pre-honed before assembly.

The wound stator may be the same as that previously described, and accordingly is identified by the same reference numeral, namely 204. Cement is brushed on to the wound, but unmolded, stator with a brush in a manner generally similar to the step shown in Fig. 30. The stator 204 then is inserted in the housing body 416, and the rear end bell 420 is assembled therewith as shown in Fig. 36. A sleeve 425 is cemented in an aperture in the housing through which the lead wires pass, and surrounds the lead wires. A special arbor 426 (Fig. 37) formed to very close tolerances then is inserted through the housing and stator. The arbor has a relatively large head 428, and a bearing seat locating section 430 is spaced axially therefrom a slight distance by a restricted neck portion 432. The restricted neck portion facilitates formation of the entire length of the bearing seat positioning portion 430 to very close tolerances while avoiding the problem of maintaining the precise diameter at the junction with the head 428. A stator positioning portion 434 is axially spaced from the bearing seat positioning portion 430 by a restricted neck portion 436, and in turn is connected by a restricted neck portion 438 to a second, and relatively smaller, bearing seat positioning portion 440. A shank 442 projects axially from the portion 440 and is provided with a threaded end 444. The bearing seat positioning portions 430 and 440 respectively engage the bearing seats 424 and 418, while the stator positioning portion 434 snugly engages the inside diameter of the stator. These three arbor portions are formed to very close tolerances as to size and concentricity, and accordingly hold bearing seats and stator inside diameter in precise concentricity while the cement is cured or set. The shank portion 442 likewise is preformed to precise tolerances and could be used for positioning an auxiliary part such as a gear housing. However, in this case a sleeve 446 is passed over the shank portion, and a nut 448 is threaded on the end 444 to hold the housing and stator in assembled relation on the arbor.

Station No. 4'

After the cement has been cured or set by the passage of time, or by heating in an oven such as the oven in Fig. 26, and this may include polymerization if a polymerizable resin is used for a cement, the arbor 426 is removed. A rubber tube 250 identical with that previously discussed then is inserted in the inside diameter of the stator, and a straight rod or arbor 450 is passed therethrough to expand the tube 250 part way into the stator windows and also to form a support for the cemented stator and housing. The exterior of the housing then is coated with the plastic stripable compound and a polymerizable resin is introduced into the interior of the housing in a vacuum chamber, and then is cured or polymerized in an oven to embed the stator in proper position in the housing. The plastic material is stripped from the housing. This sequence is substantially as discussed previously, and further details at this point would render this specification needlessly prolix.

A modification is shown in Figs. 39–41 which is applicable to either of the motor constructions heretofore discussed, i.e. the construction in which the stator is molded in a mold and then is cemented in the housing, or the construction in which the stator is molded in place in the housing. For purposes of distinction, the first motor may be called a molded motor, while the second motor may be called an embedded motor.

Rather than using a rubber tube expanded into the windows of the stator to exclude the polymerizable resin from the windows adjacent the inside diameter of the stator, this invention contemplates other possible means or steps for accomplishing this purpose. An aluminum tube 452 (Figs. 39 and 41) having longitudinal splines, ribs, or ridges 454 thereon may be inserted in the inside diameter of the stator 204 with the splines 454 projecting into the coil windows 98 in place of the rubber tube. The aluminum tube splines maintain the inner ends of the windows clear during the molding or embedding steps, and then the body of the tube 452 may be machined or ground from place in the stator leaving only the splines 454 in the inner ends of the windows. The splines at this time appear as thin metal strips and readily may be removed from the windows by means of a pointed tool, or by any other suitable means. It will be understood that other means or methods could be employed for maintaining the inner ends of the stator windows clear. The essential thing is that these window portions be maintained clear at a cost which is low in both material and labor.

The resin polymerized in the stator thoroughly insulates the windings from the housing and also insulates the wires from the stator. Furthermore, the resin has a high capillarity and coats the exterior surface of each wire thoroughly to insulate the wires from one another. In Fig. 42 there are shown several of the wires 138 forming one of the coils, for instance one of the coils 196 of one of the phase windings. Sometimes in the winding operation one or more of the wires, such as the wire 138a, will be crushed and accordingly deformed from its normal circular shape. This tends to fracture the enamel coating on the wire, and tends to lead toward break-down of the insulation of the relatively sharp corners formed such as at 138b. The polymerizable resin 294 has a sufficiently high capillarity that it penetrates the spaces between the wires, even including the space between the deformed wire, such as 138a, and an adjacent wire. The resin has high dielectric strength and thus completely protects the wires against short circuits.

It is possible to embed a stator in a two-piece (or even a three-piece) housing wherein the bearing seats and stator inside diameter are all the same. In this case, the embedded stator and housing will be passed from station No. 4' to station No. 5 for through honing as indicated by the dark line in Fig. 1. However, when these diameters are different, as in the specific illustrative example, the parts are pre-honed and are centered by the special arbor, and the embedded stator and housing by-pass station No. 5 as indicated by the fine line in Fig. 1 for final assembly.

*Station A*

The rotor is built up from a plurality of similar laminations, such as the lamination 456 shown in Fig. 43. These laminations are generally ring-like in configuration, having a central aperture 458. Each lamination also is provided with a plurality of arcuately spaced slots 460 extending radially inwardly from the periphery thereof. A plurality of the laminations 456 is stacked on an arbor 462. The arbor is provided with a tapered end 464 for facilitating positioning of the laminations on the arbor, and the arbor also is provided with a plurality of longitudinally extending splines 466 for holding the laminations in place on the arbor. Each spline 466 is formed by forcing an indentation 468 into the metal of the arbor, thereby swaging ribs 470 outwardly on each side of each indentation. There is a plurality, four in the illustrative embodiment, of such splines arcuately spaced about the arbor, and the ribs of these splines frictionally engage and slightly dig into the laminations along the inside edges thereof to hold the laminations on the arbor 462. The rotor laminations are progressively rotated as they are placed on the arbor 462 so that the slots 460 therein form skewed conductor slots 472 as shown in Fig. 46.

*Station B*

The rotor core formed by the stacked lamination on the arbor 462 then is centrifugally cast with aluminum in accordance with conventional practices to form aluminum conductors 474 in the conductor slots 472, and to form end conductors 476 of ring-like configuration (see also Fig. 49) integral therewith. This also results incidentally in a surface coating of aluminum as illustrated at 477. After the aluminum is cast in place, the arbor 462 is axially withdrawn from the cast rotor.

*Station C*

The rotor then is assembled with the motor shaft 478 shown in Figs. 48-50. In accordance with the principles of this invention, the rotor may be press fitted or cemented on the shaft, and this preferably is done in a jig as shown in Fig. 48. The jig comprises a flat base or table 480 having supporting legs 482 for supporting the same above a supporting surface. A body portion 484 extends upwardly from the base or table 480 and longitudinally thereof. Horizontal flanges 486 extend transversely outwardly from the body portion in spaced parallelism with the base or table, and also extend longitudinally of the jig. Each of the flanges 486 is provided with a plurality of longitudinally spaced apertures 488 in which bushings 490 are insertable in accordance with the size of the shaft and rotor. Bolts 492 are threaded through the base or table 480 in alignment with the central openings of the bushing 490 and serve as stops or supports which are adjustable in accordance with the length of the shaft to be handled. The shaft 478 to be assembled with each rotor is inserted in one of the bushings 490 and rests on the corresponding stop 492. Cement is placed on the shaft and the cast rotor is slipped thereonto as shown in Fig. 48. The cement then is allowed to set, or is cured, depending upon the type of cement used, following which the rotor or shaft may be turned end-for-end and further cement may be applied to the shaft at the opposite end of the rotor for entrance between the shaft and rotor by capillary action, and further to secure the rotor on the shaft by surface adhesion. The cement is omitted and close tolerances are used when the rotor is press fitted on the shaft.

It will be understood that the jig shown in Fig. 48 is usable with rotors and shafts of various sizes by replacing the bushings 490 and threadedly adjusting the stops or supports 492.

*Station D*

It is necessary that the rotor be of predetermined diameter and absolutely concentric with the stator for proper operation. Accordingly, the rough cast rotor is ground or machined for perfect concentricity. The machining operation is illustrated in Fig. 49 wherein the rough cast rotor identified by the numeral 494, and its shaft 478 are placed between the head stock and tail stock 496 and 498 of a lathe, accurate centers being provided in the ends of the shaft 478 to insure proper symmetry and balance of the rotor. The rough cast rotor is turned by the lathe and is engaged by a suitable cutting tool illustrated at 500 to turn down the outside diameter of the rotor and to render the same concentric within very narrow limits. End rings 476 of the rotor also are machined to exacting specifications, as the size and construction of these rings in large measure determine the electrical characteristics of the rotor. The rotor shaft 478 preferably is machined at this time to obtain perfect concentricity thereof.

The machined rotor 502 then is supported by any suitable means such as the centers as shown in Fig. 50 and the periphery thereof is spray painted as indicated at 504 to provide a finished appearance, and to provide corrosion resistance.

*Station No. 6*

The final assembly of the motor, and the assembled motor are shown in Figs. 51-55. The motor housing in these figures is slightly different from the housings previously shown in order to illustrate the applicability of the principles of the invention to motors of different configuration. The housing 346a in these figures comprises a cylindrical body portion 348a extending from end to end of the housing. Rear and front end bells 350a and 352a respectively fit entirely within the cylindrical body portion where they are secured by the cementing of the molded stator 310a in place. The end bells further may be secured by peening sections such as 506 into circumferential grooves 508 in the end bells, the cylindrical body portions being provided with grooves 510 at either end to provide thinner material for peening. It will be noted that the lead wires 218a extend through a thimble 374a extending longitudinally through the rear end bell rather than radially from the housing.

It will be noted that the front end bell 352a now under consideration is not provided with an integral locator hub. Instead, a separate locator hub 536 (Figs. 51, 52 and 55) is provided. This hub is in the form of a disc having an outer periphery 538 ground or machined to a very close tolerance and fitting tightly within the bearing seat 360a abutting the split ring 528. The hub is provided with a central aperture 540 through which the shaft end projects, and also with a circumferential groove 542. The hub is placed in the bearing seat, being positioned by a split ring 528 snapped into a groove 530 in the bearing seat 360a and then is spun into place.

The spinning tool as shown in Fig. 53 comprises a cylindrical member 544 having a plurality of arcuately spaced longitudinally extending spinning ears or lugs 546 on one end thereof. It has been found that three ears or lugs is an excellent number as uniform pressure thus is applied to the end bell to insure perfectly symmetrical spinning thereof. The spinning tool 544 is rotated by any suitable means, and is forced against the outer face of the front end bell 352a while snugly encircling hub 536. The beveled ends 548 of the spinning ears or lugs 546 force some of the material of the face of the rear end bell into the circumferential groove 542 of the locator hub, thus securing the hub firmly and accurately in its proper position.

A ball bearing 526 (Figs. 52 and 55) then is inserted in the bearing seat 360a with the outer race 532 positioned against the snap-ring 528. The inner bearing race 534 receives one end of the rotor shaft 478 with the extreme end of the shaft projecting outwardly through the locator hub for coupling to a suitable driven member or mechanism.

A second ball bearing 522 then is inserted into the other bearing seat 354a with the inner race 524 thereof receiving the opposite end of the rotor shaft. A suitable number of shim washers 518 is positioned in the bearing seat 354a against the outer bearing race 520. A disc washer 516 closes the rear end bell 350a and is held against the shim washers by a snap ring 514 received in a groove 512.

It will be apparent that the motor manufacturing process herein shown and described results in a precision motor wherein dimensions and concentricity are very closely controlled without the necessity of precision forming machines. The embedding of a stator directly in a housing on a precision arbor insures the close tolerances as to dimensions and concentricity, while the remolding of a motor stator followed by assembly with a housing by means of cement, and completed by through honing of the bearing seats and of the inside diameter of the stator possesses the same advantages while allowing electrical testing of the stator prior to assembly with the housing, thereby saving a housing if it is necessary to reject and discard the stator. The excellent insulating properties and high capillarity of the molding or embedding compound insure perfect insulation while allowing the use of the enameled magnet wire. The holding together of the stator laminations by means of the slot insulators of inserts, and the molding and cementing, or embedding, of the stator totally eliminate the necessity for screws or other studs which tend to have adverse effects on the electrical characteristics of the motor when inserted through, or positioned near the stator laminations, and which require precise formation of holes and of the screws or other studs to approach the tolerances achieved by the practice of this invention.

The use of the rubber tubing expanded by an arbor through the inside diameter of the stator maintains the inner ends of the stator windows clear so that expansion and contraction due to temperature changes cannot force material into the air gap between the rotor and stator. The motor thus may be operated satisfactorily in ambient temperatures ranging from −70° F. to over 300° F. The fungicidal varnish coating of the inside of the stator, the only place in which fungus could gain entrance and could find anything on which to grow, insures proper operation of the motor in tropical climates, while the specific process disclosed for applying the varnish prevents damage to an operator's hands.

The principles of the invention are applicable to small motors of many different sizes, and of somewhat different configurations, as has been illustrated herein. Although the principles of the invention are of particular interest in the production of servo motors, they are equally applicable to the manufacture of any small electrical motors wherein precision is required. Thus, it will be understood that the specific illustrations are by way of example only, and not by way of limitation. The invention incorporates all that which properly falls within the spirit and scope of the appended claims.

The invention is hereby claimed as follows:

1. The process of manufacturing electric motors which comprises stacking a plurality of stator laminations in face-to-face engagement, inserting resilient insulating members of rectangular shape in the winding slots of the stator so formed and opening outwardly radially of said slots, said insulating members being provided with outwardly directed end flanges, holding the stator laminations together with said insulating members with the end flanges thereof embracing said laminations while inserting coil windings in the winding slots of said stator, assembling said stator and coil windings with an enclosure, introducing a flowable insulating material into said enclosure about said stator and coil windings, and treating said flowable insulating material to convert the same into a non-flowable solid.

2. The process of manufacturing electric motors which comprises stacking a plurality of stator laminations in face-to-face engagement, inserting resilient insulating members of rectangular shape in the winding slots of the stator so formed and opening outwardly radially of said slots, said insulating members being provided with outwardly directed end flanges, holding the stator laminations together with said insulating members with the end flanges thereof embracing said laminations while inserting coil windings in the winding slots of said stator, and assembling said stator and coil windings with an enclosure.

3. The process of manufacturing electric motors as set forth in claim 2 wherein the insulating members before insertion in the winding slots are converted by the application of heat and pressure from substantially rectangular blanks into substantially V-shaped members having outwardly flared ends which provide said flanges.

4. The process of manufacturing electric motors as set forth in claim 2 wherein the insulating members are inserted in the coil winding windows, and further including applying heat and pressure to the ends of the insulating members to flare the same outwardly to provide said flanges for holding the insulating members and stator laminations relatively in place.

5. The process of manufacturing electric motors which comprises stacking stator laminations in face-to-face relation, inserting resilient insulating members of rectangular shape in the winding slots in the stator so formed and opening outwardly radially of said slots, said insulating members being provided with outwardly directed end flanges, holding the laminations together with said insulating members with the end flanges thereof embracing said laminations while winding coils in place in said coil winding slots, assembling the stator and coil windings with an enclosure, introducing a flowable insulating material into said enclosure about said stator and coil windings, and treating said flowable insulating material to convert the same into a non-flowable solid.

6. The process of manufacturing electric motors which comprises stacking stator laminations in face-to-face relation, inserting resilient insulating members of rectangular shape in the winding slots in the stator so formed and opening outwardly radially of said slots, said insulating members being provided with outwardly directed end flanges, holding the laminations together with said insulating members with the end flanges thereof embracing said laminations while winding coils in place in said coil winding slots, and assembling said stator and coil windings with a housing.

7. The process of manufacturing electric motors which comprises supporting a motor stator having a central bore and a plurality of winding slots opening radially inwards into said bore, assembling coil windings with said stator in the winding slots thereof, placing the wound stator in an enclosure having a cavity conforming generally to the wound stator and of somewhat larger size, said enclosure having end members each with an opening aligned with the stator bore, inserting a rubber-like tube through the stator bore and between the enclosure end members, inserting a mandrel through said tube and expanding said tube radially against the stator and extruding part way into the winding slots, introducing a flowable insulating material into said enclosure about the wound stator and the rubber-like tube, said tube maintaining said stator bore and the radially inner portions of the winding slots free of said material, treating said flowable insulating material to convert it to a non-flowable solid, and subsequently removing said mandrel and said tube.

References Cited in the file of this patent

UNITED STATES PATENTS

| | | |
|---|---|---|
| 359,205 | Curtis | Mar. 8, 1887 |
| 527,736 | Stone | Oct. 16, 1894 |
| 1,404,547 | Ruppel | Jan. 24, 1922 |
| 1,435,357 | Weber | Nov. 14, 1922 |
| 1,888,613 | Apple | Nov. 22, 1932 |
| 1,925,892 | Apple | Sept. 5, 1933 |
| 1,934,903 | Apple | Nov. 14, 1933 |
| 1,980,170 | Eaton | Nov. 13, 1934 |
| 2,109,992 | French | Mar. 1, 1938 |
| 2,153,741 | Cobi | Apr. 11, 1939 |
| 2,304,607 | Sleeter | Dec. 8, 1942 |
| 2,411,684 | Hamilton et al. | Nov. 26, 1946 |
| 2,423,345 | Roters | July 1, 1947 |
| 2,476,937 | White | July 19, 1949 |
| 2,573,126 | Andrus | Oct. 30, 1951 |
| 2,648,018 | Meier | Aug. 4, 1953 |
| 2,668,925 | Bloser | Feb. 9, 1954 |
| 2,709,228 | Miller et al. | May 24, 1955 |
| 2,761,983 | Koch | Sept. 4, 1956 |

FOREIGN PATENTS

| | | |
|---|---|---|
| 10,231 | Great Britain | 1902 |
| 723,910 | France | Apr. 18, 1932 |